United States Patent
Kalach

(10) Patent No.: US 9,673,977 B1
(45) Date of Patent: Jun. 6, 2017

(54) REFRESHING PUBLIC PARAMETERS IN LATTICE-BASED CRYPTOGRAPHIC PROTOCOLS

(71) Applicant: ISARA Corporation, Waterloo (CA)

(72) Inventor: Kassem Kalach, Waterloo (CA)

(73) Assignee: ISARA Corporation, Waterloo, Ontario (CA)

( * ) Notice: Subject to any disclaimer, the term of this patent is extended or adjusted under 35 U.S.C. 154(b) by 0 days.

(21) Appl. No.: 15/266,965

(22) Filed: Sep. 15, 2016

(51) Int. Cl.
| | |
|---|---|
| H04L 9/08 | (2006.01) |
| H04L 29/06 | (2006.01) |
| H04L 9/30 | (2006.01) |
| H04L 9/28 | (2006.01) |
| H04L 9/16 | (2006.01) |
| H04L 9/14 | (2006.01) |

(52) U.S. Cl.
CPC .......... *H04L 9/0869* (2013.01); *H04L 9/0816* (2013.01); *H04L 9/0838* (2013.01); *H04L 9/0852* (2013.01); *H04L 9/14* (2013.01); *H04L 9/16* (2013.01); *H04L 9/28* (2013.01); *H04L 9/30* (2013.01); *H04L 2209/24* (2013.01)

(58) Field of Classification Search
CPC ....... H04L 9/008; H04L 9/003; H04L 9/0816; H04L 9/14; H04L 9/28; H04L 9/30; H04L 9/08; H04L 9/0819; H04L 9/0838; H04L 9/0861; H04L 9/0869; H04L 9/0852; H04L 9/16; H04L 2209/24
See application file for complete search history.

(56) References Cited

U.S. PATENT DOCUMENTS

| | | | | |
|---|---|---|---|---|
| 8,059,814 | B1 * | 11/2011 | Duane | H04L 9/0869 380/281 |
| 9,032,212 | B1 | 5/2015 | Juels | |
| 9,432,340 | B1 * | 8/2016 | Tutt | H04L 63/0428 |
| 2002/0141591 | A1 * | 10/2002 | Hawkes | H04W 12/04 380/278 |
| 2004/0071288 | A1 * | 4/2004 | Romain | H04L 9/003 380/37 |
| 2005/0232424 | A1 * | 10/2005 | Dobranski | H04K 1/02 380/270 |
| 2011/0219233 | A1 * | 9/2011 | Zhang | H04L 9/0844 713/171 |

(Continued)

FOREIGN PATENT DOCUMENTS

DE WO 2016005075 A1 * 1/2016 ............. G06F 21/64

OTHER PUBLICATIONS

Aono, Yoshinori, et al. Fast and secure linear regression and biometric authentication with security update. Cryptology ePrint Archive, Report 2015/692, 2015. http://eprint. iacr. org, 2015.*

(Continued)

*Primary Examiner* — Michael Simitoski
(74) *Attorney, Agent, or Firm* — Henry Patent Law Firm PLLC

(57) ABSTRACT

In a general aspect, a parameter is refreshed in a lattice-based cryptography system. In some aspects, a first value of a public parameter is obtained. The first value of the public parameter may have been previously used in an execution of a lattice-based cryptography protocol. A second value of the public parameter is generated based on the first value of the public parameter and random information. The second value of the public parameter is used in an execution of the lattice-based cryptography protocol.

25 Claims, 2 Drawing Sheets

(56) References Cited

U.S. PATENT DOCUMENTS

| | | | |
|---|---|---|---|
| 2015/0180661 A1* | 6/2015 | Fujii | H04L 9/30 380/46 |
| 2016/0117448 A1* | 4/2016 | Van De Craen | G06F 19/322 705/3 |
| 2016/0149700 A1* | 5/2016 | Fu | H04L 9/0852 380/278 |
| 2016/0234011 A1* | 8/2016 | Bruno | H04L 9/065 |

OTHER PUBLICATIONS

Canetti, Ran, Shai Halevi, and Jonathan Katz. "A forward-secure public-key encryption scheme." International Conference on the Theory and Applications of Cryptographic Techniques. Springer Berlin Heidelberg, 2003.*

Fujioka, Atsushi, et al. "Practical and post-quantum authenticated key exchange from one-way secure key encapsulation mechanism." Proceedings of the 8th ACM SIGSAC symposium on Information, computer and communications security. ACM, 2013.*

Singh, Kunwar, C. Pandurangan, and A. Banerjee. "Lattice based forward-secure identity based encryption scheme with shorter ciphertext." Journal of Internet Services and Information Security (JISIS) 3.1/2 (2013): 5-19.*

Singh, Vikram, and Arjun Chopra. "Even More Practical Key Exchanges for the Internet using Lattice Cryptography." (2015).*

Alkim, E., et al., "TESLA: Tightly-Secure Efficient Signatures from Standard Lattices," Cryptology ePrint Archive: Report 2015/755, dated Jul. 29, 2015, 25 pages.

Adrian, D., et al., "Imperfect Forward Secrecy: How Diffie-Hellman Fails in Practice," 22nd ACM Conference on Computer and Communications Security (CCS '15), Denver, CO, Oct. 2015, 13 pages.

Alkim, E. et al., "Post-quantum key exchange—a new hope," Cryptology ePrint Archive: Report 2015/1092, dated Mar. 29, 2016, 21 pages.

Bos, J., et al., "Post-quantum key exchange for the TLS protocol from the ring learning with errors problem," Cryptology ePrint Archive: Report 2014/599, dated Mar. 16, 2015, 29 pages.

Fluhrer, S., "Cryptanalysis of ring-LWE based key exchange with key share reuse," Cryptology ePrint Archive: Report 2016/085, dated Jan. 30, 2016, 7 pages.

Fisher, R., et al., "Statistical Tables for Biologocial, Agricultural and Medical Research," Sixth Edition, Oliver and Boyd, London, Hafner Press, New York, 1963, 155 pages.

Peikert, C., "How (Not) to Instantiate Ring-LWE," Cryptology ePrint Archive: Report 2016/351, dated Apr. 2, 2016, 30 pages.

Regev, O., "On Lattices, Learning with Errors, Random Linear Codes, and Cryptography," Proceedings of the 37th annual ACM symposium on theory of computing, New York, May 2005, 10 pages.

Stehle, D. et al., "Making NTRUEncrypt and NTRUSign as Secure as Standard Worst-Case Problems over Ideal Lattices," Cryptology ePrint Archive: Report 2013/004, dated Jan. 3, 2013, 38 pages.

Knuth, D., "The Art of Computer Programming," A Draft of Section 7.2.1.2: Generating All Permutations, Addison Wesley, dated Dec. 2004, 66 pages.

European Telecommunications Standards Institute (ETSI); Quantum Safe Cryptography and Security, ETSI White Paper No. 8, Jun. 2015, France, 64 pages.

* cited by examiner

REFRESHING PUBLIC PARAMETERS IN LATTICE-BASED CRYPTOGRAPHIC PROTOCOLS

BACKGROUND

The following description relates to refreshing public parameters in lattice-based cryptographic protocols.

Cryptography systems are used to communicate securely over public channels. For example, some cryptography systems provide confidentiality by encrypting messages, and some cryptography systems provide authenticity through digital signatures. Cryptography systems may encrypt messages based on shared secrets, which may be generated based on public parameters.

DETAILED DESCRIPTION

In some aspects of the present disclosure, public parameters for use in cryptographic protocols are refreshed for newly-initiated cryptographic communication sessions. The public parameters may be refreshed using one or more of the techniques described herein rather than being recomputed each time a new cryptographic communication session is initiated.

For instance, implementations of the present disclosure may refresh an already-known public parameter (e.g., one that has been previously generated, computed, or otherwise obtained) and use the refreshed public parameter in the new session. The public parameter may be refreshed by applying a permutation, a mask, a rotation, a hash function, or any combination thereof, to an already-known (e.g., a publicly-known or previously-computed) public parameter. The operations used to refresh the public parameter may be based on random information. For example, a permutation or mask used to refresh the public parameter may be randomly-generated.

Performing operations such as those described herein to refresh the public parameter may be computationally more efficient than regenerating public parameters using more complex operations. More generally, the techniques described below can be used in some instances to reduce the amount of computational resources consumed in the generation of cryptographic parameters. For example, the techniques described below can reduce the amount of computational resources consumed (processing and/or channel bandwidth) by nodes in computing a public parameter for use in new communications sessions. The techniques described below may additionally prevent all-for-the-price-of-one style attacks on cryptographic protocols, where an adversary (e.g., one with supercomputing power) may compute the public parameter by brute force or other techniques.

Figure 1:
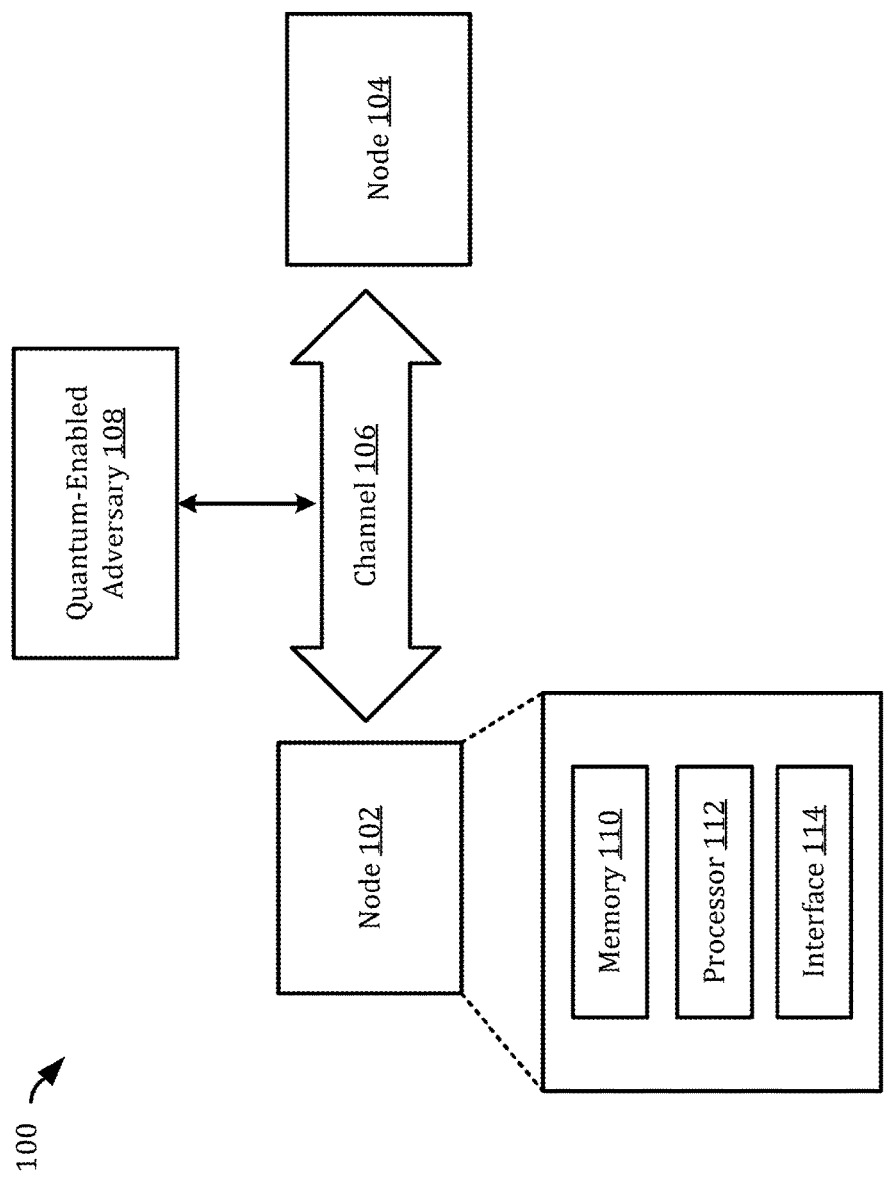
FIG. 1 is a block diagram showing aspects of an example communication system.

FIG. 1 is a block diagram showing aspects of an example communication system 100. The example communication system 100 shown in FIG. 1 includes two nodes 102, 104 that use a cryptographic scheme to communicate with each other over a channel 106. In the example shown, a quantum-enabled adversary 108 has access to information exchanged on the channel 106. A communication system may include additional or different features, and the components in a communication system may be configured to operate as shown or in another manner.

In some implementations, the nodes 102, 104 have a server-client relationship. For example, the node 102 can be a server and the node 104 can be its client in a served network, or vice-versa. In some implementations, the nodes 102, 104 have a peer-to-peer relationship. For example, the nodes 102, 104 can be peers in a peer-to-peer network. The nodes 102, 104 may have another type of relationship in the communication system 100.

The example nodes 102, 104 each have computational resources (e.g., hardware, software, firmware) that are used to communicate with other nodes. In some implementations, the nodes 102, 104 can be implemented in various systems, such as, for example, laptops, desktops, workstations, smartphones, tablets, personal digital assistants, servers, server clusters, mainframes, and other types of computer systems. As shown in FIG. 1, the example node 102 includes a memory 110, a processor 112 and an interface 114. Each of the nodes 102, 104 may include the same, additional or different components, and the nodes 102, 104 may be configured to operate as shown and described with respect to FIG. 1 or in another manner.

In the example node 102 shown in FIG. 1, the memory 110 can include, for example, random access memory (RAM), a storage device (e.g., a writable read-only memory (ROM) or others), a hard disk, or another type of storage medium. The example memory 110 can store instructions (e.g., computer code, a computer program, etc.) associated with an operating system, computer applications and other resources. The memory 110 can also store application data and data objects that can be interpreted by one or more applications or virtual machines running on the node 102. The node 102 can be preprogrammed, or it can be programmed (and reprogrammed), by loading a program from another source (e.g., from a DVD-ROM, from a removable memory device, from a remote server, from a data network or in another manner). In some cases, the memory 110 stores computer-readable instructions for software applications, scripts, programs, functions, executables or other modules that are interpreted or executed by the processor 112. For example, the computer-readable instructions can be configured to perform one or more of the operations shown in FIG. 2.

In the example node 102 shown in FIG. 1, the processor 112 can execute instructions, for example, to generate output data based on data inputs. For example, the processor 112 can run computer programs by executing or interpreting the software, scripts, programs, functions, executables, or other modules stored in the memory 110. In some instances, the processor 112 may perform one or more of the operations shown in FIG. 2.

The example processor 112 shown in FIG. 1 can include one or more chips or chipsets that include analog circuitry, digital circuitry or a combination thereof. In some cases, the processor 112 includes multiple processor devices such as, for example, one or more main processors and one or more co-processors. For instance, the processor 112 may include a main processor that can delegate certain computational tasks to a cryptographic co-processor, which may be configured to perform the computational tasks more efficiently than the main processor or in parallel with other computational tasks performed by other processor devices. In some instances, the processor 112 coordinates or controls operation of other components of the node 102, such as, for example, user interfaces, communication interfaces, peripheral devices and possibly other components.

In the example node 102 shown in FIG. 1, the interface 114 provides communication with other nodes or devices. In some cases, the interface 114 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 114 includes a wired communication interface (e.g., USB, Ethernet) that can be connected to one or more input/output devices, such as, for example, a keyboard, a pointing device, a scanner, or a networking device such as a switch or router, for example, through a network adapter.

The example channel 106 can include all or part of a connector, a data communication network or another type of communication link. For example, the channel 106 can include one or more wired or wireless connections, one or more wired or wireless networks or other communication channels. In some examples, the channel 106 includes a Local Area Network (LAN), a Wide Area Network (WAN), a private network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown, the quantum-enabled adversary 108 has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubits encodings. In some implementations, the quantum-enabled adversary 108 can operate in a fault-tolerant regime, or the quantum-enabled adversary may operate below the fault-tolerant regime.

Many public-key cryptography systems are known to be insecure against an attacker armed with a scalable quantum computer. For example, the Diffie-Hellman (DH) and elliptic curve Diffie-Hellman (ECDH) key agreement protocols are vulnerable to certain types of attacks by quantum-enabled adversaries. The threat of quantum computers to public key cryptography can be mitigated by switching to other public key cryptosystems that are believed to be invulnerable to quantum attack. For example, a protocol referred to as "New Hope" has been proposed as a quantum-resistant replacement for contemporary key agreement protocols such as the Diffie-Hellman (DH) and elliptic curve Diffie-Hellman (ECDH) (see "Post-quantum key exchange—a new hope," by Erdem Alkim, Léo Ducas, Thomas Pöppelmann, and Peter Schwabe, March 2016).

In some implementations, the example quantum-enabled adversary 108 can perform quantum computing algorithms, execute quantum computing circuits or quantum communication protocols, or perform other types of quantum information processing tasks. In the example shown, the quantum-enabled adversary 108 can perform Shor's algorithm, which allows the quantum-enabled adversary to efficiently solve problems that are believed to be hard on a classical computer. For example, the quantum-enabled adversary 108 may use Shor's algorithm to factor large integers, find discrete logarithms or possibly to solve other problems in a computationally-efficient manner.

The example quantum-enabled adversary 108 shown in FIG. 1 can access information exchanged on the channel 106. For example, the quantum-enabled adversary 108 may access some or all of the information sent from the node 102 to the node 104 or to another recipient. In some instances, the quantum-enabled adversary 108 can directly observe correspondence between the nodes 102, 104; in some instances, the quantum-enabled adversary 108 indirectly obtains such correspondence, for example, by receiving information observed on the channel 106 by another entity or system.

In some implementations, the quantum-enabled adversary 108 can factor integers, compute discrete logarithms or perform other classically-hard computational tasks fast enough to compromise the security of certain cryptographic algorithms. For example, the quantum-enabled adversary 108 may be capable of computing prime factors fast enough to compromise certain RSA encryption standards or computing discrete logarithms fast enough to compromise certain ECC encryption standards.

In the example shown in FIG. 1, the nodes 102, 104 can use quantum-resistant cryptographic protocols that cannot be compromised by the example quantum-enabled adversary 108. For instance, the nodes 102, 104 may use a cryptographic protocol that is secure against a quantum computer that can efficiently execute Shor's algorithm or other types of algorithms that are known to compromise the security of certain conventional cryptography standards.

In some implementations, the nodes 102, 104 use a digital signature scheme that allows each node to verify the authenticity of messages received from the other node, and the digital signature scheme can be a quantum-resistant scheme that is not vulnerable to the quantum computing resources of the quantum-enabled adversary 108. In some implementations, the nodes 102, 104 use an encryption scheme that allows each node to send confidential messages to the other node, and the encryption scheme can be a quantum-resistant scheme that is not vulnerable to the quantum computing resources of the quantum-enabled adversary 108. Such digital signature schemes and encryption schemes can include or be used in conjunction with a key agreement protocol that is also secure against attacks by the quantum-enabled adversary 108. In some examples, the nodes 102, 104 can use the example techniques shown in FIG. 2, or the nodes 102, 104 may use variations of these and other techniques to communicate on the channel 106.

In some implementations, the nodes 102, 104 use a lattice-based cryptography scheme in their communications over the channel 106. The security of lattice-based cryptography schemes is based on the apparent hardness of certain problems on point lattices in an n-dimensional Euclidean space $\mathbb{R}^n$. Some lattice-based cryptography schemes are believed to be secure against quantum-enabled adversaries.

For example, it is believed that no efficient quantum algorithms are known for the hard problems typically used in lattice-based cryptography. Examples of lattice-based cryptography techniques include learning-with-errors-based (LWE) key agreement protocols, LWE encryption protocols, ring-learning-with-errors-based (Ring-LWE or RLWE) key agreement protocols, Ring-LWE encryption protocols, ring-learning-with-rounding-based (Ring-LWR or RLWR) key agreement protocols, Ring-LWR encryption protocols, NTRU algorithms (e.g., NTRUEncrypt, NTRUSign, etc.), Bimodal Lattice Signature Schemes (BLISS), PASS algorithms (e.g., PASSSign, etc.), TESLA (Tightly-secure, Efficient signature scheme from Standard LAttices) protocols, ring-TESLA protocols, and others.

Figure 2:
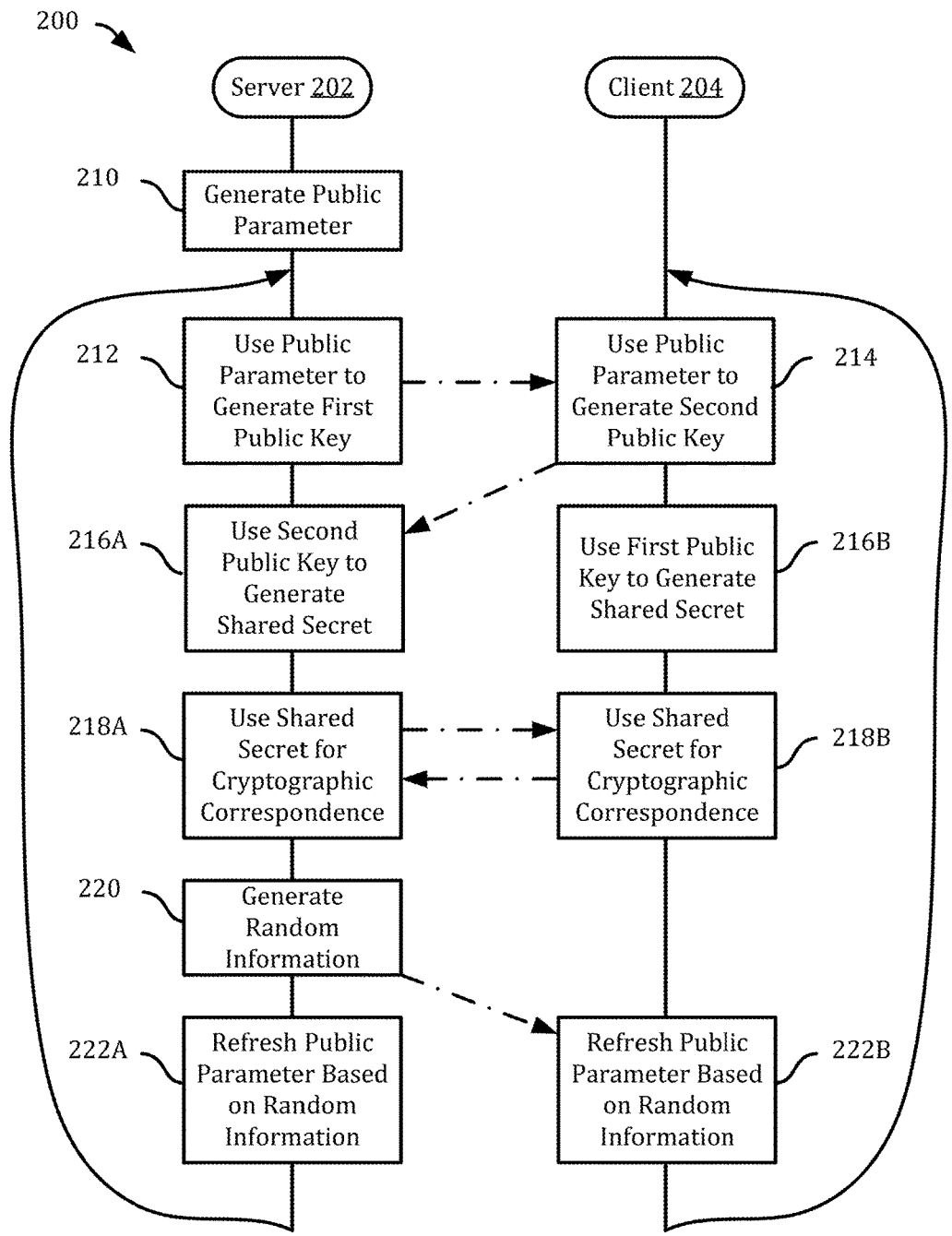
FIG. 2 is a flow diagram showing aspects of an example process for refreshing a public parameter in a lattice-based cryptographic protocol.

FIG. 2 is a flow diagram showing aspects of an example process 200 for refreshing a public parameter in a lattice-based cryptographic protocol. As an example, in some aspects, parameters in the New Hope protocol discussed above may be refreshed rather than regenerated each session to achieve computational resource savings. For instance, the public parameter a in the New Hope proposal can be viewed as a 1024-element array of integers in $\{0, \ldots, 12288\}$. The computational cost of generating the public parameter a in the New Hope proposal includes the computation of pseudorandom data, which may require significant computational resources. As another example, in some aspects, parameters of the TESLA (Tightly-secure, Efficient signature scheme from Standard LAttices) signature scheme and its variants (including Bai-Galbraith and ring-TESLA signature schemes) may be refreshed rather than regenerated for each session, resulting in computational resource savings as well. A reduction in the computation of pseudorandom data in the generation of the public parameters in the New Hope protocol or TESLA signature scheme (or its variants), such as by refreshing of the public parameters for each session as opposed to regeneration of the parameters, could yield a significant savings in computational resources.

The example process 200 of FIG. 2 can be performed, for example, by computer systems that can exchange information over a communication channel. For instance, operations in the process 200 may be performed by the nodes 102, 104 in the example communication system 100 shown in FIG. 1 or in another type of system. The example process 200 may include additional or different operations, including operations performed by additional or different entities, and the operations may be performed in the order shown or in another order. In some cases, one or more of the operations shown in FIG. 2 are implemented as processes that include multiple operations, sub-processes or other types of routines. In some cases, operations can be combined, performed in parallel, iterated or otherwise repeated or performed in another manner.

The example process 200 shown in FIG. 2 includes operations performed by a server 202 and a client 204. In the example shown, the server 202 and the client 204 represent two distinct entities in a cryptographic protocol. In the example shown, the server 202 initiates a key agreement protocol, and sends public data to the client 204; the client 204 uses the public data and the key agreement protocol to generate a shared secret or another cryptographic key with the server 202. The public data sent from server 202 to client 204 may be compressed in some instances. Similarly, the public data sent from client 204 to server 202 may be compressed in some instances. In some cases, the server 202 and client 204 may have a server-client relationship, a peer-to-peer relationship or another type of relationship.

In some examples, the process 200 is secure against quantum-enabled adversaries such as, for example, the quantum-enabled adversary 108 shown in FIG. 1. For instance, in some cases, the example process 200 is secure against certain types of attacks or other processes that can be performed by a quantum-enabled adversary who has access to public information exchanged between the server 202 and the client 204. The example process 200 may also provide security against classically-enabled adversaries who do not have access to quantum computers or other quantum resources.

Although described below with regard to a Ring-LWE protocol, such as the New Hope protocol, the teachings of the present disclosure may be used in a LWE-based protocol. For instance, the teachings may be applied to a LWE-based version of the New Hope protocol.

At 210, a public parameter for use in a cryptography system is generated. In some implementations, the public parameter is an array of integers. In some implementations, a lattice-based cryptography scheme defines a ring of integer polynomials, where each integer coefficient is reduced by a modulus q. An array of such integer coefficients can be used as a parameter in some lattice-based cryptography schemes. For example, an array of randomly-selected integers, each less than the modulus q, is used as a public parameter in some lattice-based key agreement protocols. The array of randomly-selected integers, each less than the modulus q, can be generated based on the output of a pseudorandom number generator (e.g., a pseudorandom bit stream) or another source of randomness. The array can be combined with other values (e.g., a secret value, other system parameters, etc.) in a key agreement protocol to generate a shared secret. For instance, the "New Hope" proposal provides an example algorithm for generating a shared secret based on an array of randomly-selected integers less than the modulus 12289. An array of randomly-selected integers, each less than a modulus can be used in another manner in a lattice-based cryptography scheme, for example, to generate other types of parameters, with other moduli, etc.

In some implementations, the public parameter is a ring element of a quotient ring defined for a lattice-based cryptography system. For example, the public parameter may be a ring element of the quotient ring $R_q = \mathbb{Z}_q[x]/(x^n+1)$, where $\mathbb{Z}_q = \{0, \ldots, q-1\}$. The quotient ring may be defined by values of n and q. Elements of $R_q$ may be n-dimensional arrays of integers modulo q in certain implementations, with n=1024 and $q=12289<2^n$. Thus, the public parameter may be an array of dimension n=1024 with elements in $\{0, 1, \ldots, q-1\}$.

In some implementations, a lattice-based signature scheme may be used (e.g., TESLA or its variants) that uses an array of randomly-selected (or "random-looking") integers, each less than a modulus. The TESLA signature scheme was introduced as a variant of the Bai-Galbraith signature scheme, and a ring-based variant of TESLA, called ring-TESLA, has also been introduced. Public keys in the TESLA signature scheme and its variants contain a public parameter that can be implemented in a manner that is analogous to the public parameter a in New Hope. For example, TESLA and Bai-Galbraith signature schemes include a public parameter A that is a two-dimensional matrix with entries in $\mathbb{Z}_q$; and ring-TESLA signature schemes include a public parameter a that is an array with 512 elements. TESLA and ring-TESLA signature schemes may specify the respective public parameters A, a as fixed, global parameters of the cryptosystem, but such schemes can be modified so that the respective public parameters A, a are instead unique to each distinct public key. Bai-Galbraith signature schemes may also specify the public parameter A as unique to each distinct public key, rather than a fixed, global parameter.

The public parameter may be generated by server 202 using a random seed value. The seed value can be a seed for a pseudorandom number generator. For example, the server 202 may select a seed value that includes 256 randomly-selected bits, and may generate the public parameter by applying a hash function to the seed value. The hash function may be a secure hash algorithm of the primitive family Keccak, such as the SHAKE-128 or SHAKE-256 extendable-output functions. For example, the seed value and the public parameter a may be generated, respectively, according to the equations:

$$seed \xleftarrow{\$} \{0,1\}^{256}$$

$$a \leftarrow Parse(SHAKE\text{-}128(seed))$$

where a represents the public parameter, seed represents a 256-bit the seed value, and the $\xleftarrow{\$}$ operator represents a random sampling operation. The output of the SHAKE-128( ) hash function may be interpreted as an array of 16-bit unsigned little-endian integers, with each of those integers being reduced by modulo q to become elements of the public parameter array a.

At 212, the server 202 uses the public parameter to generate a first public key. The server 202 may use other information in addition to the public parameter to generate the first public key. For example, one or more values may be generated by sampling an error distribution (e.g., a Gaussian distribution) over a quotient ring defined for a lattice-based cryptography system, such as the ring $R_q$ described above. The values may be sampled from the distribution $\psi_{16}^n$, which is a probability distribution over $R_q$ whereby each of the n coefficients are selected independently according to $\psi_{16}$ (which is a centered binomial distribution supported on the integer set $\{-16, \ldots, 16\}$). Thus, values may be sampled according to the equation:

$$s,e \xleftarrow{\$} \psi_{16}^n$$

where s and e represent two values sampled from the error distribution $\psi$.

The server 202 may then generate the first public key using the public parameter and the values obtained by sampling the error distribution. For example, the first public key may be generated according to the following equation:

$$b \leftarrow as + e$$

where b represents the first public key, and s, e represent the values obtained from sampling the error distribution. The first public key may therefore be a ring element of a quotient ring defined for a lattice-based cryptography system, such as the quotient ring $R_q$ described above.

In the example shown, the first public key is then sent to the client 204. The server 202 may send additional information along with the first public key. For example, the server 202 may send the seed value used to generate the public parameter to the client 204 along with the first public key. Although the generation of the first public key is described above in a particular manner, the first public key may be generated in any other suitable manner using the public parameter.

At 214, the client 204 generates a second public key using the public parameter. The client 204 may generate the public parameter from a seed value (e.g., a seed value used by the server 202 to generate the public parameter, and sent to the client 204 by the server 202 at 212). For instance, the client 204 may generate the public parameter from a seed value according to the following equation:

$$a \leftarrow Parse(SHAKE\text{-}128(seed))$$

where a represents the public parameter and seed represents the seed value.

The client 204 may use other information in addition to the public parameter to generate the first public key. For example, one or more values may be generated by sampling an error distribution (e.g., a Gaussian distribution) over a quotient ring defined for a lattice-based cryptography system, such as the ring $R_q$ described above. The values may be sampled from the distribution $\psi_{16}^n$, which is a probability distribution over $R_q$ whereby each of the n coefficients are selected independently according to $\psi_{16}$ (which is a centered binomial distribution supported on the integer set $\{-16, \ldots, 16\}$). Thus, values may be sampled according to the equation:

$$s',e',e'' \xleftarrow{\$} \psi_{16}^n$$

where s', e', and e'' represent three values sampled from the error distribution $\psi$.

The client 204 may then generate the second public key using the public parameter and the values obtained by sampling the error distribution. For example, the second public key may be generated according to the following equation:

$$u \leftarrow as' + e'$$

where u represents the second public key, and s', e' represent two of the values obtained from sampling the error distribution. The second public key may therefore be a ring element of a quotient ring defined for a lattice-based cryptography system, such as the quotient ring $R_q$ described above. Although the generation of the second public key is described above in a particular manner, the second public key may be generated in any other suitable manner using the public parameter.

In the example shown, the second public key is then sent to the server 202. The client 204 may send additional information along with the second public key. For example, the client 204 may generate an additional value that is based on the first public key and send the additional value to the server 202 at 214. As an example, a value v may be generated based on the following equation:

$$v \leftarrow bs' + e''$$

where b represents the first public key, and s', e'' represent two of the values obtained from sampling the error distribution. The value v may therefore be a ring element of a quotient ring defined for a lattice-based cryptography system, such as the quotient ring $R_q$ described above. The value v may then be used to generate the additional value that is sent to the server 202 along with the second public key. As an example, the additional value may be generated by sampling an output of a reconciliation function with v as an input to the function (e.g., the HelpRec(v) function described in the New Hope proposal). For example, the additional value r may be generated according to the equation below:

$$r \xleftarrow{\$} HelpRec(v)$$

where r represents the additional value, and HelpRec( ) represents an example reconciliation function.

At 216A and 216B, a shared secret is generated based on second public key and the first public key, respectively. That is, the server 202 generates a shared secret based on the second public key sent by the client 204 at 214, and the client 204 generates the shared secret based on the first public key sent by the server 202 at 212. In some implementations, the shared secret is generated using a hash function.

For example, the client 204 may use the values v and r discussed above to generate a new value using a reconciliation function. The new value may be generated by the client 204 according to following equation:

$$v \leftarrow Rec(v,r)$$

where v represents the new value, and Rec( ) represents a reconciliation function (e.g., the Rec( ) function described in the New Hope proposal). The server 202 may generate the same new value using the value r discussed above and the second public key. For example, the server 202 may generate the new value according to the following equation:

$$v \leftarrow Rec(us,r)$$

where us represents the product of the second public key u and the value s discussed above, and r represents the additional value r discussed above.

The new value may be used as an input to the hash function, and the output of the hash function may be the shared secret. For example, the shared secret may be generated according to the following equation:

$$\mu \leftarrow SHA3\text{-}256(v)$$

where $\mu$ represents the shared secret generated by each of the server 202 and the client 204, and SHA3-2560 represents an example secure hash algorithm that is applied to the value v.

At 218A and 218B, the server 202 and the client 204 use the shared secret for a session of cryptographic correspondence. For example, the shared secret $\mu$ generated as described above may be used to encrypt or decrypt a message, to sign or verify a message or to generate other parameters that are used for cryptographic correspondence. The shared secret may be used in another manner.

After the session of cryptographic correspondence at 218A and 218B, the server 202 generates random information at 220, and sends the random information to the client 204. The random information may be generated in any suitable manner, and may be any suitable information for use in refreshing the public parameter, as described in particular examples below. In some implementations the random information includes an operator for use in refreshing the public parameter at 222A and 222B. For example, as described below, the random information may include a randomly-generated permutation or a randomly-generated mask that is applied to the public parameter in order to refresh the public parameter. The randomly-generated permutation or mask may be generated by selecting a random permutation or mask, or by selecting randomly from a number of predetermined permutations or masks.

Once the random information has been generated, at 222A and 222B, the server 202 and the client 204 refresh the public parameter based on the random information generated at 220. In some implementations, refreshing the public parameter includes refreshing the public parameter obtained at 210. For example, the process 200 may run through many iterations such that the public parameter is refreshed many times. However, each time the public parameter is refreshed, it may be refreshed based on the public parameter obtained at 210 rather than a refreshed version of the public parameter (e.g., a version of the public parameter refreshed in a second or subsequent iteration of the process 200). In some implementations, refreshing the public parameter includes refreshing a previously-refreshed public parameter. For example, the process 200 may run through many iterations such that the public parameter is refreshed many times. Each time the public parameter is refreshed at 222A and 222B, it may be refreshed based on a refreshed version of the public parameter (e.g., a version of the public parameter refreshed in a second or subsequent iteration of the process 200) and not the public parameter obtained at 210.

In some implementations, the public parameter has been previously generated using a hash function, and the refreshed version of the public parameter is generated independent of the hash function. For example, the public parameter may have been generated using the SHAKE-128( ) function as described above, and the refreshed version of the public parameter may be generated independent of the SHAKE-128( ) function. For instance, the refreshed version of the public parameter may be generated using one or more of the operations described below (e.g., using a permutation or a mask).

In some implementations, the public parameter is refreshed by applying a permutation to the public parameter. Applying a permutation may include rearranging elements of an array based on a particular permutation. Applying a permutation to the public parameter may include applying the permutation to one or more portions of the public parameter, or applying the permutation to the entire public parameter. For instance, a public parameter a may be an n-length array of integers, and the permutation $\pi$ may be an m-length permutation, where m≤n. An m-length permutation has m! possibilities and may be encoded in m⌈log m⌉ bits (or less, in some instances), where the ⌈·⌉ operator refers to a ceiling operator wherein the result is rounded to the nearest integer value that is greater than or equal to the result.

In some implementations, the permutation applied to refresh the public parameter has a length that is the same as the length of the public parameter. For instance, the public parameter a is an n-length array and the permutation $\pi$ is an n-length permutation. As an example, with a public parameter a=(0,3,5,7,9,11,13,15) and a permutation $$\pi = \begin{pmatrix} 12345678 \\ 53261874 \end{pmatrix},$$

the result is a'=$\pi$(a)=(9,5,3,15,0,7,13,11), which may be used as the refreshed public parameter. Where n=1024, the permutation would have 1024!>$2^{8769}$ possibilities. Such implementations would include the server 202 sending the n-length permutation to the client 204 at 220. Where n=1024, the amount of data sent would be approximately 10 Kbits (1.25 kB).

In some implementations, the permutation applied to refresh the public parameter has a length that is less than the length of the public parameter. For instance, if the public parameter a is an n-length array, the permutation $\pi$ is an m-length permutation where m<n. The permutation $\pi$ may accordingly be applied to ⌊n/m⌋ distinct subarrays within the public parameter a, where ⌊·⌋ refers to a floor operator wherein the result is rounded to the nearest integer that is less than or equal to the result. As an example, where n=1024 and m=64, the permutation $\pi$ would be applied to 16 distinct subarrays of the public parameter a. As an example, with a public parameter a=(0,3,5,7,9,11,13,15) and a permutation $$\pi = \begin{pmatrix} 1234 \\ 1342 \end{pmatrix},$$

then the permutation may be applied to each of the subarrays $a_1=(0,3,5,7)$ and $a_2=(9,11,13,15)$ to yield $a'_1=(0,7,3,5)$ and $a'_2=(9,15,11,13)$. The permuted subarrays may be recombined to yield $a'=(0,7,3,5,9,15,11,13)$, which may be used as the refreshed public parameter.

Where m=64, the permutation $\pi$ has more than $2^{256}$ possible values and may be encoded by 384 bits, which may preserve bandwidth used to send the permutation $\pi$ from the server 202 to the client 204. A 64-bit permutation may also be computationally efficient to apply by the server 202 and the client 204 as compared, for example, with the functions used to generate the public parameter in the New Hope protocol. Where n is not a multiple of m, the remaining elements in the array may be treated in any suitable manner. For example, the remaining elements may be left in their current position within the public parameter, or a rotation may be applied to the remaining elements. The length m of the permutation $\pi$ may be chosen such that $m! \geq 2^l$, where l is a desired level of security that makes possible values of the permutation $\pi$ sufficiently large. For example, where m=64, all-for-the-price-of-one attacks by pre-computation may be $2^{256}$ times more difficult.

In some implementations, the public parameter is refreshed by rotating elements of the public parameter, either before or after applying a permutation $\pi$. The elements may be rotated any suitable number of r times (left or right). Rotating array elements may include re-positioning elements of the array r elements to the left or right in the array. As an example, if an array $a=(0,3,5,7,9,11,13,15)$ is rotated r=2, the result may be $(5,7,9,11,13,15,0,3)$. A permutation $$\pi = \begin{pmatrix} 1234 \\ 1342 \end{pmatrix},$$

then the permutation may be applied to each of the subarrays $a_1=(5,7,9,11)$ and $a_2=(13,15,0,3)$ to yield $a'_1=(5,11,7,9)$ and $a'_2=(13,3,15,0)$. The permuted subarrays may be recombined to yield $a'=(5,11,7,9,13,3,15,0)$, which may be used as the refreshed public parameter. Rotating the elements in the public parameter may improve the security of the refresh operation, for example, when the length of the permutation m is relatively small such that all-for-the-price-of-one attacks become more feasible. The number of rotations r may be pre-determined, or may be randomly determined (e.g., the number of rotations r may be determined at 220 as part of the random information generated).

In some implementations, the public parameter is refreshed by applying a mask to an output of a permutation $\pi$. Applying a mask may include combining two bit strings. For example, applying a mask may include applying an exclusive-or operator to a first bit string and a second bit string (e.g., a mask may be applied to a first bit string x=10110101 and a second bit string y=1110011, and the output of the mask may be $x \oplus y=01010010$). As another example, a mask may include performing bitwise addition modulo 2 to the first bit string and the second bit string.

In some implementations, applying the mask to the output of a permutation applied to a public parameter array a may include encoding the array a as a bit string $\alpha$, and applying an exclusive-or operator to the bit string $\alpha$ and a mask bit string $\beta$ (applying the mask may be equivalent to $\alpha \oplus \beta$). Encoding the array a as a bit string may include concatenating bit string representations of elements in the array a. For example, an encoded bit string $\alpha$ for a public parameter array $a=(11,5,3,8)$ using 4-bit encoding may be $\alpha=(1011010100111000)$. The mask bit string $\beta$ may be any suitable bit string that is the same length as the bit string $\alpha$. The output of the mask may then be reconstructed into array format. Referring to the previous example where $\alpha=(1011010100111000)$, and the mask bit string $\beta=(1110011111100111)$, the output of the mask may be $(0101001011011111)$, which may become the array $(5,2,13,15)$ after reconstructing into 4-bit integer elements.

In some implementations, applying the mask to the output of a permutation applied to an array may include applying an exclusive-or operator to each element of the array encoded as a bit string (a[i], where i refers to the specific element of array a) and a mask bit string $\beta$. The mask bit string $\beta$ may be any suitable bit string that is the same length as the element encoded as a bit string $\alpha[i]$. Using the above example, where $a=(11,5,3,8)$ or $(1011,0101,0011,1000)$ in 4-bit representation, a mask bit string $\beta=(1111)$ may be applied to each element of a to yield $a'=(0100,1010,1100,0111)$ or $(4,10,12,7)$, which may be used as the refreshed public parameter.

In some implementations, a combination of the operations described above is used to refresh the public parameter. For example, elements of the public parameter may first be rotated, with a permutation $\pi$ applied to distinct subarrays of the rotated public parameter. A mask may then be applied to the output of the permutation $\pi$ applied to the subarrays of the rotated public parameter. Any other suitable combination of operations may be used.

In some implementations, the public parameter is refreshed by applying a mask to the public parameter. Applying a mask to the public parameter may include applying the mask to one or more portions of the public parameter, or applying the mask to the entire public parameter. Applying a mask to the public parameter may include combining the public parameter with a randomly-generated array. Applying the mask to the public parameter may include encoding a public parameter array a as a bit string $\alpha$, and applying an exclusive-or operator to the bit string $\alpha$ and a mask bit string $\beta$. The mask bit string $\beta$ may be any suitable bit string that is the same length as the bit string $\alpha$. The output of the mask may then be reconstructed into array format to yield the refreshed public parameter. As an example, where the public parameter $a=(11,5)$, the public parameter may be encoded into a bit string $\alpha=10110101$. A mask bit string $\beta=11100111$ applied to a may yield $\alpha'=\alpha \oplus \beta=01010010$, which may in turn be reconstructed into $a'=(5,2)$, which may be used as the refreshed public parameter.

In some implementations, the public parameter is refreshed by applying a mask to distinct subarrays within the public parameter. For example, the public parameter may first be encoded into a bit string $\alpha$ of length n, and a mask of length m (where m<n) may be applied to $\lfloor m/n \rfloor$ portions of bit string $\alpha$. As an example, where n=1024 and m=64, the mask would be applied to 16 distinct portions of the bit string $\alpha$. The result of applying the mask to the distinct portions of the bit string $\alpha$ may then be reconstructed into an array, which may be used as the refreshed public parameter. For example, an encoded bit string $\alpha$ for a public parameter array $a=(11,5,3,8)$ using 4-bit encoding may be $\alpha=(1011010100111000)$. Applying a mask bit string $\beta=(11100111)$ to each of the first half ($\alpha_1=(10110101)$) and the second half ($\alpha_2$=(00111000)) of $\alpha$ may produce an output $\alpha'$=(0101001011011111), which may be reconstructed into array a'=(5,2,13,15) using 4-bit integer elements.

In some implementations, the public parameter is refreshed by rotating elements of the array either before or after applying a mask to the public parameter. In some implementations, the elements of the array are rotated within distinct subarrays of the array. For example, elements of the public parameter array a may be rotated as described above, and the rotated array may be encoded into a bit string $\alpha$. A mask may then be applied to the bit string $\alpha$, and the result may be reconstructed into an array for used as the refreshed public parameter. For instance, a public parameter array a=(11,5,3,8) may be rotated r=1 to yield (5,3,8,11), and using 4-bit encoding, may become $\alpha$=(0101001110001011). Applying a mask bit string $\beta$=(11100111) to each of the first half ($\alpha_1$=(01010011)) and the second half ($\alpha_2$=(10001011)) of $\alpha$ may produce an output $\alpha'$=(1011010001101100), which may be reconstructed into array a'=(11,4,6,12), which may be used as the refreshed public parameter.

As another example, the public parameter array a may be first encoded into a bit string $\alpha$, and the bits of $\alpha$ may be rotated before applying a mask to the rotated bit string. The output of the mask may then be reconstructed into an array for used as the refreshed public parameter. For instance, an encoded bit string $\alpha$ for a public parameter array a=(11,5,3,8) using 4-bit encoding may be $\alpha$=(1011010100111000). The bit string $\alpha$ may then be rotated r=1 to yield (0110101001110001). Applying a mask bit string $\beta$=(11100111) to each of the first half ($\alpha_1$=(01101010)) and the second half ($\alpha_2$=(01110001)) of $\alpha$ may produce an output $\alpha'$=(1000110110010110), which may be reconstructed into array a'=(8,13,9,6), which may be used as the refreshed public parameter.

In some implementations, the public parameter is refreshed by applying a mask that is based on the public parameter. For example, instead of generating random information (e.g., a random mask) at 220 as described above, the mask may be based on the first public key (b←as +e), which is pseudorandom. For instance, the first public key may be encoded as a bit string $\beta$ and used as a mask bit string in a mask operation with the public parameter encoded as a bit string $\alpha$. In this manner, the need to generate additional random information at 220 is eliminated and bandwidth savings are achieved.

In some implementations, a combination of the operations described above is used to refresh the public parameter. For example, the public parameter may first be encoded into a bit string $\alpha$, and distinct portions of $\alpha$ may be rotated (e.g., the two halves of the bit string $\alpha$=(1011010100111000) may each be rotated once to the right to produce $\alpha'$=(1101101000011100). A mask may then be applied to the output $\alpha'$, and the output of the mask may be reconstructed into an array to yield the refreshed public parameter. The mask may be applied in any suitable manner, such as to the entire output $\alpha'$ or to distinct portions of $\alpha'$. Any other suitable combination of operations may be used.

In some implementations, the public parameter is refreshed by applying a hash function to the public parameter. The hash function may be applied to one or more portions, or to the entirety, of a bit string encoding of the public parameter array. For example, a hash function family $H=\{h_k\}_{k \in K}$ that maps l-bit strings to l'-bit strings may be used, where $h_k: \{0,1\}^l \to \{0,1\}^{l'}$ is an element of H for a randomly-chosen k, and the hash function $h_k$ may be applied to distinct l-bit portions of the bit string encoding $\alpha$ of the public parameter array a. The hash function used to refresh the public parameter (e.g., $h_k$) may be different and independent of a hash function used to initially generate the public parameter (e.g., the SHAKE-128( ) described above).

In some implementations, a statefull approach to refreshing the public parameter may be used. For example, an initial session of the process 200 may establish a shared public parameter while subsequent sessions of the process 200 may establish a secret key using a refreshed version of the shared public parameter. The initial session may be executed once, with the shared public parameter being stored by the server 202 and the client 204. Subsequent sessions may refresh the shared public parameter, and the key agreement may accordingly become statefull. The state may be only between the server 202 and the client 204 (not the server 202 and a different client; non-global). In the event of a crash in the communication between the server 202 and the client 204, the initial session may be re-run to establish the initial state between the server 202 and the client 204.

Once the public parameter is refreshed at both the server 202 and the client 204, the process 200 returns to 212 and 214, where the refreshed public parameter is used to generate the first public key and the second public key, respectively.

Although the process 200 is described above as refreshing a public parameter in a lattice-based cryptography protocol, private keys or shared secrets may be refreshed using the techniques described herein. For instance, the techniques described herein may be used for refreshing error correction codes in code-based cryptography systems.

In addition, although the process 200 is described above as obtaining and refreshing a public parameter that has been previously used in a first execution of a lattice-based cryptography protocol, the public parameter may not have been previously used in any execution of the protocol. For instance, in some implementations, the process 200 may refresh the public parameter generated at 210 according to the techniques described above prior to using the public parameter at 212 and 214 to generate the first and second public keys, respectively.

Furthermore, although described above as generating a public parameter at 210, in some implementations, the public parameter may be a fixed, publicly-known parameter. The fixed public parameter may be used in process 200 once before being refreshed, or the fixed public parameter may be refreshed as described above before being used in process 200. For example, the server 202 may generate or otherwise obtain random information at 210 and use the random information to refresh the public parameter at 212 using one or more of the techniques described above (before using the refreshed parameter to generate the first public key). The server 202 may then send the random information to the client 204 (instead of the seed value as described above), and the client 204 may similarly use the random information to refresh the public parameter at 214 using one or more of the techniques described above.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, public parameters for use in a lattice-based cryptography system are refreshed.

In a first example, a lattice-based cryptography method includes obtaining a first value of a public parameter. The first value of the public parameter was previously used in a first execution of a lattice-based cryptography protocol. A second value of the public parameter is generated based on the first value of the public parameter and random information. The second value of the public parameter is then used in a second execution of the lattice-based cryptography protocol.

In a second example, a computing system includes a data processing apparatus and a computer-readable medium storing instructions that are operable when executed by the data processing apparatus to perform one or more operations of the first example.

In a third example, a computer-readable medium stores instructions that are operable when executed by a data processing apparatus to perform one or more operations of the first example.

Implementations of the first, second, or third example may include one or more of the following features. Generating the second value of the public parameter may include applying a permutation to the first value of the public parameter. The random information may include a randomly-generated permutation, and applying the permutation may include applying the randomly-generated permutation. The first value of the public parameter may include an array, and applying the permutation may include applying the permutation to multiple distinct sub-arrays within the array. The first value of the public parameter may include an array, and generating the second value may include rotating elements of the array. Generating the second value of the public parameter may include applying a mask to an output of the permutation. The first value of the public parameter may include an array, and generating the second value of the public parameter may include rotating elements of the array, applying the permutation to multiple distinct sub-arrays within the array, and applying a mask to the array.

Implementations of the first, second, or third example may include one or more of the following features. Generating the second value of the public parameter may include applying a mask to the first value of public parameter. The random information may include a randomly-generated array, and applying the mask to the first value of the public parameter may include combining the randomly-generated array with the first value. The first value of the public parameter may include an array, and applying the mask to the first value of the public parameter may include applying the mask to multiple distinct sub-arrays within the array. The first value of the public parameter may include an array, and generating the second value of the public parameter may include rotating elements within distinct sub-arrays within the array. The mask may be generated based on the first value of the public parameter.

Implementations of the first, second, or third example may include one or more of the following features. Generating the second value of the public parameter may include applying a hash function to the first value of public parameter.

Implementations of the first, second, or third example may include one or more of the following features. The first value of the public parameter may include a first ring element of a quotient ring defined for the lattice-based cryptography protocol. A secret value may be generated that is a second ring element of the quotient ring, and the secret value may be based on sampling an error distribution over the quotient ring. A public key may be generated based on combining the first value of the public parameter and the secret value.

Implementations of the first, second, or third example may include one or more of the following features. The first value of the public parameter may be generated using a hash function, and the second value of the public parameter may be generated from the first value of the public parameter independent of the hash function.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A lattice-based cryptography method comprising:
    obtaining a first value of a public parameter previously used in a first execution of a lattice-based cryptography protocol;
    generating, by operation of one or more processors, a second value of the public parameter based on the first value of the public parameter and random information, wherein the random information comprises a randomly-generated permutation, and generating the second value of the public parameter comprises applying the randomly-generated permutation to the first value of the public parameter; and
    using the second value of the public parameter in a second execution of the lattice-based cryptography protocol, wherein the second execution of the lattice-based cryptography protocol comprises:
        generating a public key based on the second value of the public parameter; and
        sending the public key to a correspondent over a channel.

2. The lattice-based cryptography method of claim 1, wherein the first value of the public parameter comprises an array, and applying the permutation comprises applying the permutation to multiple distinct sub-arrays within the array.

3. The lattice-based cryptography method of claim 1, wherein the first value of the public parameter comprises an array, and generating the second value comprises rotating elements of the array.

4. The lattice-based cryptography method of claim 1, wherein generating the second value of the public parameter comprises applying a mask to an output of the permutation.

5. The lattice-based cryptography method of claim 1, wherein the first value of the public parameter comprises an array, and generating the second value of the public parameter comprises:
    rotating elements of the array;
    applying the permutation to multiple distinct sub-arrays within the array; and
    applying a mask to the array.

6. The lattice-based cryptography method of claim 1, wherein the first value of the public parameter comprises a first ring element of a quotient ring defined for the lattice-based cryptography protocol, and the method comprises:
    generating a secret value that is a second ring element of the quotient ring, wherein the secret value is based on sampling an error distribution over the quotient ring; and
    generating a public key based on combining the first value of the public parameter and the secret value.

7. The lattice-based cryptography method of claim 1, wherein the first value of the public parameter is generated using a hash function, and the second value of the public parameter is generated from the first value of the public parameter independent of the hash function.

8. The method of claim 1, comprising:
generating the random information; and
sending the random information to a correspondent over a channel.

9. A computing system comprising:
a data processing apparatus;
a computer-readable medium storing instructions that are operable when executed by the data processing apparatus to perform operations comprising:
obtaining a first value of a public parameter previously used in a first execution of a lattice-based cryptography protocol;
generating a second value of the public parameter based on the first value of the public parameter and random information,
wherein the random information comprises a randomly-generated permutation and generating the second value of the public parameter comprises applying the randomly-generated permutation to the first value of the public parameter; and
using the second value of the public parameter in a second execution of the lattice-based cryptography protocol,
wherein the second execution of the lattice-based cryptography protocol comprises:
generating a public key based on the second value of the public parameter; and
sending the public key to a correspondent over a channel.

10. The computing system of claim 9, wherein the first value of the public parameter comprises an array, and applying the permutation comprises applying the permutation to multiple distinct sub-arrays within the array.

11. The computing system of claim 9, wherein the first value of the public parameter comprises an array, and generating the second value comprises rotating elements of the array.

12. The computing system of claim 9, wherein generating the second value of the public parameter comprises applying a mask to an output of the permutation.

13. The computing system of claim 9, wherein the first value of the public parameter comprises an array, and generating the second value of the public parameter comprises:
rotating elements of the array;
applying the permutation to multiple distinct sub-arrays within the array; and
applying a mask to the array.

14. The computing system of claim 9, wherein the first value of the public parameter comprises a first ring element of a quotient ring defined for the lattice-based cryptography protocol, and the operations comprise:
generating a secret value that is a second ring element of the quotient ring, wherein the secret value is based on sampling an error distribution over the quotient ring; and
generating a public key based on combining the first value of the public parameter and the secret value.

15. The computing system of claim 9, wherein the first value of the public parameter is generated using a hash function, and the second value of the public parameter is generated from the first value of the public parameter independent of the hash function.

16. The computing system of claim 9, wherein the operations comprise:
generating the random information; and
sending the random information to a correspondent over a channel.

17. A non-transitory computer readable medium storing instructions that are operable when executed by a data processing apparatus to perform operations comprising:
obtaining a first value of a public parameter previously used in a first execution of a lattice-based cryptography protocol;
generating a second value of the public parameter based on the first value of the public parameter and random information,
wherein the random information comprises a randomly-generated permutation and generating the second value of the public parameter comprises applying the randomly-generated permutation to the first value of the public parameter; and
using the second value of the public parameter in a second execution of the lattice-based cryptography protocol,
wherein the second execution of the lattice-based cryptography protocol comprises:
generating a public key based on the second value of the public parameter; and
sending the public key to a correspondent over a channel.

18. The computer readable medium of claim 17, wherein generating a second value of the public parameter comprises applying a permutation, a mask, a rotation, a hash function, or any combination thereof to the first value of the public parameter.

19. The computer readable medium of claim 17, wherein the first value of the public parameter comprises an array, and applying the permutation comprises applying the permutation to multiple distinct sub-arrays within the array.

20. The computer readable medium of claim 17, wherein the first value of the public parameter comprises an array, and generating the second value comprises rotating elements of the array.

21. The computer readable medium of claim 17, wherein generating the second value of the public parameter comprises applying a mask to an output of the permutation.

22. The computer readable medium of claim 17, wherein the first value of the public parameter comprises an array, and generating the second value of the public parameter comprises:
rotating elements of the array;
applying the permutation to multiple distinct sub-arrays within the array; and
applying a mask to the array.

23. The computer readable medium of claim 17, wherein the first value of the public parameter comprises a first ring element of a quotient ring defined for the lattice-based cryptography protocol, and the method comprises:
generating a secret value that is a second ring element of the quotient ring, wherein the secret value is based on sampling an error distribution over the quotient ring; and
generating a public key based on combining the first value of the public parameter and the secret value.

24. The computer readable medium of claim 17, wherein the first value of the public parameter is generated using a hash function, and the second value of the public parameter is generated from the first value of the public parameter independent of the hash function.

25. The computer readable medium of claim 17, wherein the operations comprise:
   generating the random information; and
   sending the random information to a correspondent over a channel.

\* \* \* \* \*